(No Model.)
J. R. JUDD.
FIRE ESCAPE.
No. 266,998. Patented Nov. 7, 1882.
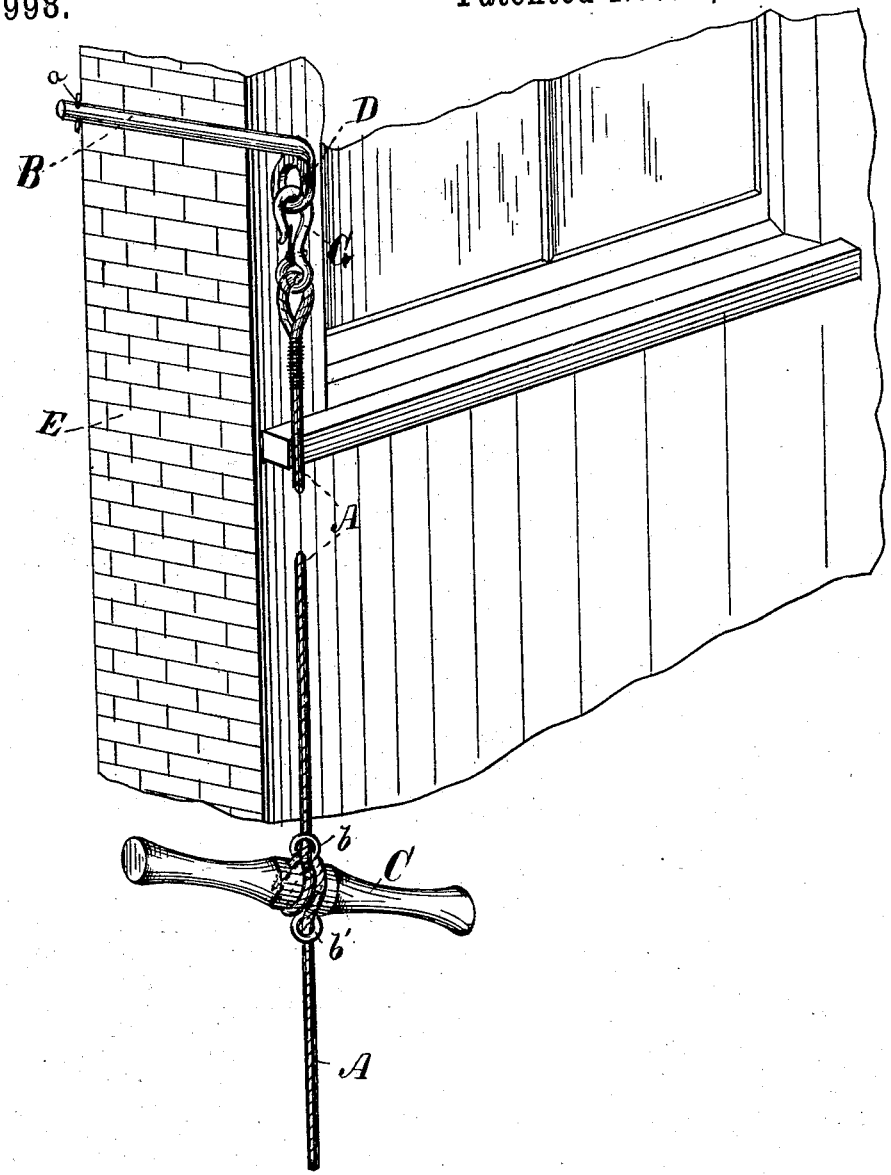
Witnesses:
Inventor
John R. Judd
by J. P. Fitch
his atty.

UNITED STATES PATENT OFFICE.

JOHN R. JUDD, OF NEW YORK, N. Y.

FIRE-ESCAPE.

SPECIFICATION forming part of Letters Patent No. 266,998, dated November 7, 1882.

Application filed May 23, 1882. (No model.)

*To all whom it may concern:*

Be it known that I, JOHN R. JUDD, of the city of New York, in the county and State of New York, have invented a new Fire-Escape, of which the following is a specification, reference being had to the accompanying drawing, forming a part of the same, showing my fire-escape secured to the side of a window on the outside of a building.

My invention relates to a fire-escape consisting of a rope intended to be suspended from a fastening at one end to the outside of a building, preferably near a window or door, and having connected with it, as hereinafter described, one or more horizontal rounds or bars, arranged to slide on the rope, of which a person may take hold, or on which a person may be seated, and let himself safely down to the ground, or to which a sling may be attached for the same purpose.

In the drawing, A represents the rope attached at the upper end to an arm, B, and depending therefrom to or near the ground. The upper end of the rope is provided with a hook, G, preferably a snap-hook, as shown, by which it is detachably connected to the arm B, the said arm being provided with a pendent eye, D, at its outer end to receive the said hook, as shown in the drawing. The said arm may be detachably connected with the building by being passed through a hole made through the wall E, and secured in place by a pin, $a$, through the inner end of the said arm, as shown in the drawing, or by a nut or any equivalent device.

C is a round or bar, that may be provided with a groove around the middle of it, and connected with the rope by having the rope looped around it, the loop lying in the groove when a groove is provided. The rope, besides being looped around the bar C, passes through two eyes or guides, $b\ b'$, attached to the said round. These eyes stand out from the round at opposite sides of it, so that when the rope is passed through them, after being looped around the bar C, it will be bent out of a straight line above and below the bar and in the eyes or guides $b\ b'$, as shown in the drawing. These guides serve the double purpose of increasing the friction of the rope on the said bar and holding the said bar in a horizontal position or at right angles or nearly right angles to the rope.

It is obvious that if the eyes $b\ b'$ are fixed to the bar C so that they are not diametrically opposite each other, but nearer together on the side opposite the crossing of the rope than on the side of the crossing, the friction will be increased just in proportion as they are so brought nearer together. If desired, the rope may be looped more than once around the bar C before being passed through the eyes or guides.

To the lower end of the rope a weight, F, may be attached, which is suspended just above the ground where the escape is in use. This serves to keep the rope taut below the round or bar C, and thereby cause and maintain the requisite friction between the rope and the said round. A weight of from four to seven or eight pounds I have found to be sufficient to practically operate well.

If desired, a sling, basket, bag, platform, or similar device for receiving and carrying a person may be suspended on the bar or round C, or connected with the rope immediately above the upper eye or guide, $b$. Such a device may be suspended on the said round in any practicable way, as by ropes or chains secured to the round and the basket, &c., or a rope sling merely may be provided, each end of which may be connected with the round C. The connection may be made with the round at any point or points desired, either near the center or between the center and the ends, either by looping the rope or chain around the bar C, or by eyes, staples, rings, or otherwise. The rope or chain connected with said sling may, if preferred, be connected with the rope A by means of a loop, ring, thimble, or eye placed on the rope immediately above the upper eye or guide, $b$, so that the sling will descend only as the round C slides down.

This escape is operated in the following manner: The rope A being attached to the building at or near a window or door, and the horizontal bar C being within reach of a person from the door or window, the person seats himself on the said bar astride of the said rope, or in the sling, if the latter device is attached to the bar. His weight will tighten the rope around the said bar, so as to cause sufficient friction to prevent at least the rapid descent of the bar. If the said bar should descend too rapidly, the motion is lessened or arrested by grasping the rope upwardly below the bar C and pulling, and the downward movement of the said bar is accelerated by similarly grasping said rope and pulling upward.

Any desired number of horizontal bars or rounds C may be connected with the rope A, thus making provision for the escape of a number of persons.

I have shown a practicable and convenient way of attaching the upper end of the rope A to a building; but I do not intend to limit myself to any particular method or means of attachment.

The eyes or guides $b\ b'$ may be constructed so that the rope can be introduced into them otherwise than by passing the ends of the rope through them. They may be made in the form of open hooks. If thus formed they should be bent spirally, the free end extending so as to form somewhat more than a circle, to prevent the accidental detachment of the rope from the hook.

While the primary and principal purpose of the device I have described is that of a fire-escape, it is obvious that it may be employed for other purposes—such as suspending and lowering a workman while painting or doing any work on the outside of buildings or on telegraph-poles or other objects.

When the fire-escape is not in use it may be detached from the building or other object, either by unhooking it from the arm or any other equivalent device, and placed where it can be conveniently thrown from the window or door of a building and attached to the said arm or other device, and the said arm itself may be detached from the building or other object and deposited with the escape for convenient use.

What I claim as my invention, and desire to secure by Letters Patent, is—

A fire-escape consisting of a rope or chain, A, provided with means of attaching one end thereof to a building or other object, and the horizontal bar C, connected with said rope or chain by the same being looped around said bar, and passing through eyes or guides $b\ b'$, secured to said bar, all constructed and arranged and combined as and for the purpose described.

Witness my hand this 20th day of May, 1882.

J. R. JUDD.

In presence of—
   A. G. N. VERMILYA,
   G. W. BEEBEE.